Oct. 20, 1942.　　　　A. F. GROLL　　　　2,299,387
FRICTION DRIVE MECHANISM
Filed Aug. 1, 1940　　　　3 Sheets-Sheet 1

INVENTOR.
ALVIN F. GROLL
BY
ATTORNEYS.

Oct. 20, 1942.     A. F. GROLL     2,299,387
FRICTION DRIVE MECHANISM
Filed Aug. 1, 1940     3 Sheets-Sheet 2

INVENTOR.
ALVIN F. GROLL
BY
ATTORNEYS.

Oct. 20, 1942.  A. F. GROLL  2,299,387
FRICTION DRIVE MECHANISM
Filed Aug. 1, 1940  3 Sheets-Sheet 3

INVENTOR.
ALVIN F. GROLL
BY
ATTORNEYS.

Patented Oct. 20, 1942

2,299,387

UNITED STATES PATENT OFFICE 2,299,387

FRICTION DRIVE MECHANISM

Alvin F. Groll, Toledo, Ohio, assignor to E. W. Bliss Company, Brooklyn, N. Y., a corporation of Delaware Application August 1, 1940, Serial No. 349,198

13 Claims. (Cl. 192—18)

The present invention relates to a friction drive assembly effected through a plurality of interdisposed plates and is more particularly directed to two such units, one of which is adapted to act as a clutch and the other of which functions as a brake.

Composite clutch and brake units in which the brake is set when the clutch is released and the brake released upon actuating the clutch generally represent constructions which are well known in the art. Such units consist of a series of brake plates and a series of clutch plates and a driven member with plates adapted to engage the brake and clutch respectively. Spring members are normally provided to engage the brake upon release of a fluid supply to piston mechanism engaging the clutch and similarly the clutch is engaged by an applied force of sufficient magnitude to overcome the springs and release the brake at the time the friction clutch drive is instituted.

A chief object of the present invention has been to provide a unit as indicated generally above which will be of simple and improved construction and in which the piston and cylinder clutch actuating mechanism is disposed between the clutch plates.

A further object of the invention has been to provide a compact unit which may be easily taken apart for repair without dismantling the mechanism and removing the friction plates and the like from the end of the shaft, an operation requiring considerable dismantling of the equipment. Still another object has been to provide an improved piston and cylinder mechanism including a sealing member which may be replaced easily.

To the accomplishment of the foregoing and related ends, said invention, then, consists of the means hereinafter fully described and particularly pointed out in the claims; the annexed drawings and the following description setting forth in detail certain structure embodying the invention, such disclosed means constituting, however, but one of various structural forms in which the principle of the invention may be used.

Figure 1:
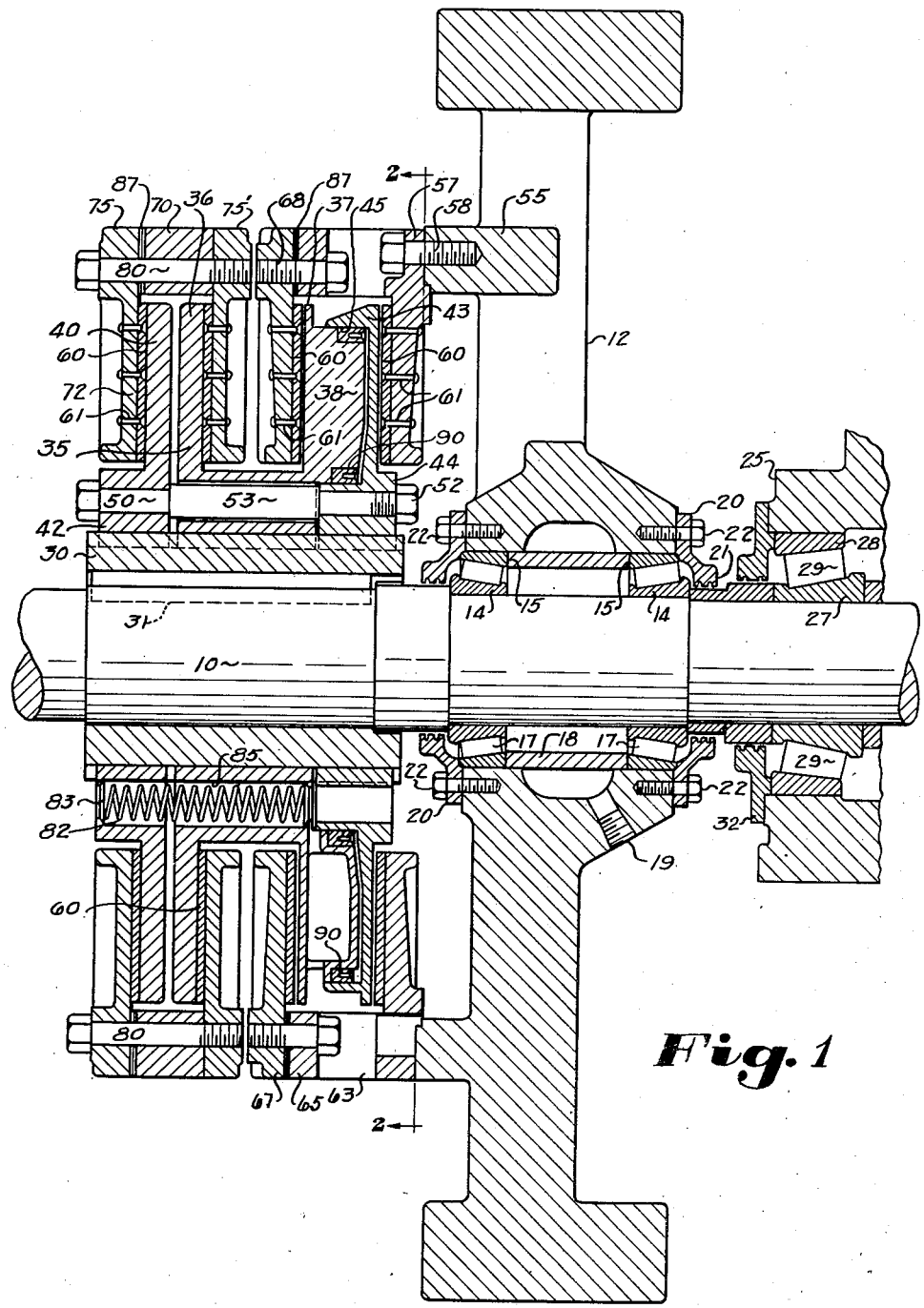
Fig. 1 is a transverse section through my improved clutch and brake unit in a plane passing through the axis of the driven shaft.
Figure 2:
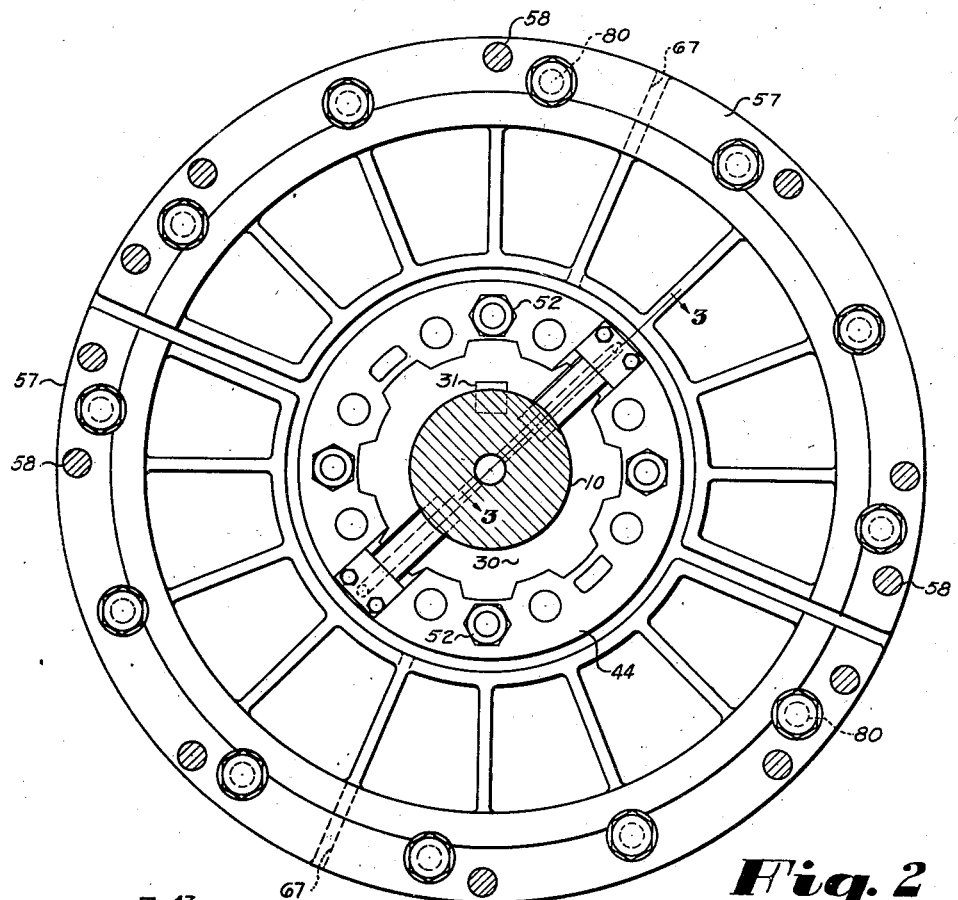
Fig. 2 is a section transversely of Fig. 1 as indicated by the lines 2—2 thereon.
Figure 3:
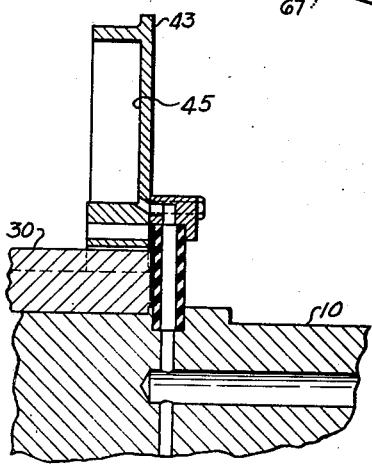
Fig. 3 is a fragmentary section through Fig. 2, as indicated by the line 3—3 thereon.
Figure 4:
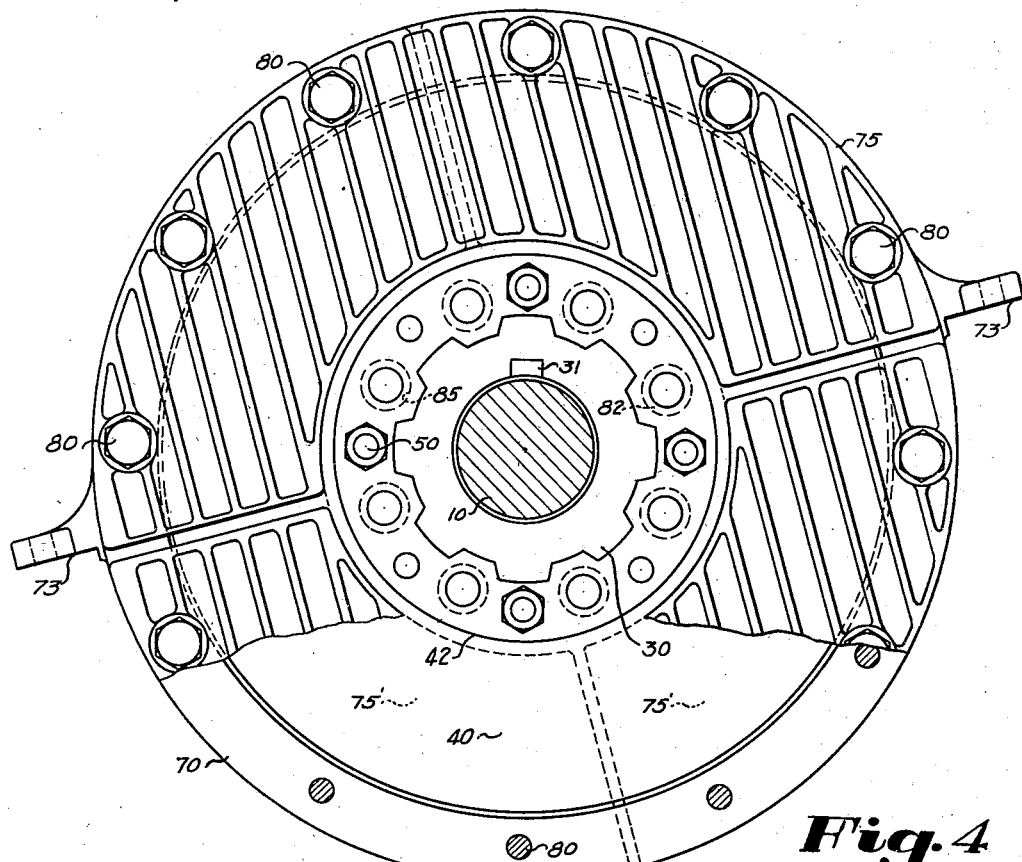
Fig. 4 is a transverse section similar to Fig. 2 showing the assembly of one set of friction plates.

Referring now to Figs. 1 and 2, I provide the usual driven shaft 10 which supports idly thereon a flywheel 12. Interposed between the flywheel and the shaft are a pair of tapered roller bearings comprising inner and outer raceways 14 and 15, respectively, between which are provided series of rollers 17. The outer races are spaced from each other by a spacing ring 18. To permit lubrication of the bearings a tapered opening 19 is provided by which the hollow flywheel interior may be packed with grease or other lubricant.

To prevent leakage of the lubricant beyond the ends of the flywheel a pair of discs 20, provided with seals 21, are bolted to the flywheel as at 22 to provide a self-contained flywheel unit.

To support the shaft 10, tapered roller end bearings are provided in the machine tool housing 25. These bearings, as indicated, comprise inner races 27, outer races 28 and rollers 29. A lubricant seal 32 similar to the seal 20 just described is provided to retain lubricant for the bearings within the housing.

The clutch and brake mechanism of the present invention is particularly adapted for use in metal working presses and the like but it will be apparent, however, that its field of application is not so limited, and that such a construction or parts of the same embodying the invention may be used in other types of mechanisms where a separate drive is desired between a driver and a driven member.

The flywheel, mounted as indicated for idle rotation on the shaft 10, is driven from belting extending about the wheel periphery in a manner well known in the art.

To support the driven elements of the clutch and brake mechanism a sleeve 30 is mounted on the shaft 10 and is keyed thereto as at 31 for fixed rotation with the shaft. The outer periphery of the sleeve is splined in an axial direction to slidingly receive thereon a spider 35 mounted to be shiftable axially of the shaft. The spider is provided with a pair of annular flanges 36 and 37, the opposing faces of which are finished to provide friction engagement with friction plates hereafter described. The flange 37 is formed with an annular ring 38 forming the piston of the clutch engaging mechanism. This piston extends entirely around the shaft.

Also slidably carried on the spline is a flange plate 40, which at its base is thickened as at 42 and keyed to be mounted in rotative relation with the sleeve 30 while slidable therealong. A second ring 43 is provided which is likewise thickened at 44 and is slidably received on the said spline. The flange portion 43 is of considerable thickness and is recessed as at 45 to provide a cylinder in which the piston element 38 is received. Packing hereafter described, provides a seal between the piston and cylinder.

From the description thus far it will be apparent that if fluid is admitted between the piston 38 and cylinder 45 the two will be forced apart, resulting in movement of the flanged faces 37 and 43 away from each other. At the same time the flanges 36 and 40 are forced toward each other. This latter relative motion is effected because the thickened hub portions 42 and 44 are bolted together by bolts 50 secured by nuts 52 and carrying spacing sleeves 53, by which the flanges 43 and 36 are fixedly mounted with respect to each other.

The flywheel carries a clutching mechanism consisting of a ring 55 integral with the flywheel and carrying a ring 57 formed of two semi-circular members, each bolted to the ring 55 by bolts 58. Each half of the ring 57 is faced at 60 with friction facing material riveted thereto as at 61. The rings 57 are each provided with an axial extension 63 terminating in an annular face 65, to which are bolted a second pair of semi-circular plates 67, as by bolts 68. The plates 67 are likewise faced with friction material 60, riveted thereto as at 61. The semi-circular plates 67 and the semi-circular plates 57 are so mounted with respect to each other that the ends of the two plates are 90° apart, in other words, staggered, to permit one set of plates to reinforce the other annularly.

As the friction facings on the plates 57 and 67 are fixedly held with respect to each other and are in turn carried by the flywheel it will be apparent that as fluid is admitted through the hollow shaft 10 between the piston 38 and the cylinder 45 the faces 37 and 43 will be forced apart into frictional engagement with the friction facings just described. Thus a friction drive between the flywheel and the shaft 10 is effected to transmit the load of the flywheel to the shaft and in turn actuate a work member to be driven thereby.

To stop the rotation of the driven shaft and the operation of the machine a brake mechanism similar in general to the clutch just described is provided. This consists of a brake ring 70 provided with radial extensions 73 by which the same is fixedly bolted to the frame of the machine. Each plate is formed with an inwardly extending face 72 provided with friction material 60 riveted thereto at 61. The brake ring 70 extends about the shaft 10 and not only supports the half plates 75, but a second set of half plates 75', which are likewise provided with friction material 60. It will be noted that the friction facing 60 of the latter set of plates is opposed to the friction facing of the first set of brake plates. A series of bolts 80 securely hold the ring 70 and the two semi-circular sets of brake plates 75 and 75' together as a unit.

As already described, two outwardly extending flanges 36 and 40 are provided integral with the piston 38 and the cylinder 45 respectively. These plates are disposed between the opposed friction surfaces of the brake rings and as the piston and cylinder are separated with respect to each other, due to the admittance of pressure therebetween, the flanges 36 and 40 move toward each other and away from respective brake plates.

To normally urge the said flanges into frictional engagement with the brake plates, a series of springs 82 are provided, nested at one end in the widened portion 42 of the flange member 40 as indicated at 83 and at the other end received in bores 85 formed in the spider 35. It will be noted from the drawings that the springs 82 and the bolts 50 extend alternately about the entire periphery of the shaft 10. Thus when the fluid pressure between the piston and cylinder is released the springs 82 coact to force the piston and cylinder toward each other, thereby releasing the clutch and at the same time engaging the brake members to simultaneously release the flywheel from the shaft and engage the shaft with the brake members and, through them, with the machine frame due to the extension 73.

The friction faces above described will from time to time show evidences of wear and to this end, upon initial assembly, shims 87 are provided between the parts which may be removed as wear takes place to permit adjustment of the mechanism.

Figure 7:
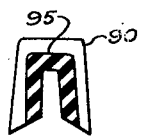
Fig. 7 is a section through Fig. 6 as indicated by the line 7—7 thereof.
Figure 5:
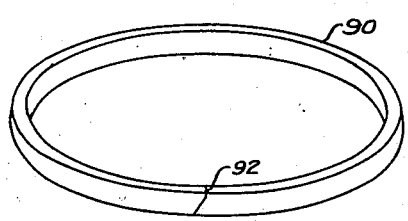
Fig. 5 is a perspective view of a packing member employed in the cylinder and piston mechanism.
Figure 6:
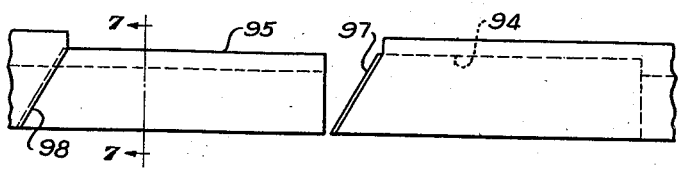
Fig. 6 is an enlarged view of the ring showing its formation at the abutting ends.

The packing ring employed in the piston 38 to seal the same with respect to the cylinder 45 is of novel construction and is best shown in Figs. 5, 6 and 7. This ring, indicated at 90, is formed of neoprene and is generally channel-shaped as shown in Fig. 7. The tendency of the channel sides of the ring to separate provides a tight seal between the piston and cylinder. To permit easy assembly the ring is split as indicated at 92 and a tight seal effected between the split ends by the construction shown in Fig. 6. As here shown, one ring portion is hollowed out as at 94 to telescopically receive the other ring portion 95, which is of reduced width and length, as shown in Fig. 7. The two ends are telescoped with respect to each other until the end 97 of one abuts the shoulder 98 of the other. The shoulder 98 is slightly recessed inwardly transversely of the ring and the end 97 tapered outwardly to permit a slight telescoping of the shoulder and end, respectively. Similarly, the shoulder and end are formed at a substantial angle to the axis of the ring to further improve the sealing qualities at the joint. From this construction it will be manifest that upon assembly, due to the telescoping of the packing rings, the effect of a continuous ring is obtained and there will be no leakage at the joint between the two ends.

The entire clutch mechanism is adapted for ready assembly and disassembly as evidenced by the provision of the split rings and plates and the peculiar formation of the packing ring member 90. With this construction it is possible to replace the friction surfaces to the piston packing and other parts of the mechanism without taking down the machine and backing the shaft out of the housing. With the present invention all that is necessary to remove whichever bolts 58, 68 or 80 are indicated and thereafter remove the desired plates for repair or resurfacing. In the same manner the piston and cylinder may be separated to permit new packing rings 90 to be installed when necessary.

Fluid, either air or oil, to actuate the clutch is supplied in the usual manner through a central bore in the shaft 10 and thence through cross-passages into the cylinder 45.

From the foregoing description it will be apparent that I have provided an improved clutch and brake mechanism including particular advantages over those heretofore known, of simple construction and wherein the piston and cylinder are disposed between the clutch faces and in which easy disassembly for repair or replacement is possible without removal of the driven shaft or most of the parts thereon.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A friction drive member comprising a brake and a clutch, a shaft, an element rotatable with said shaft, a plurality of friction surfaces comprising the clutch and a plurality of friction surfaces comprising the brake, said clutch and brake surfaces being mounted for alternate engagement, a pair of members slidably carried by said rotatable element and movable relative to each other, flanges carried by each member with a flange of each member in cooperating position with said clutch surfaces and a second flange in cooperating position with said brake surfaces, piston and cylinder means to shift said members and engage said clutch.

2. A friction drive member comprising a brake and a clutch shaft, a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member in cooperating position with said clutch surfaces and a second flange in cooperating position with said brake surfaces, piston and cylinder means to shift said members and engage one set of said friction surfaces.

3. A friction drive member comprising a brake and a clutch, a shaft a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member in cooperating position with said clutch surfaces and a second flange in cooperating position with said brake surfaces, piston and cylinder means to shift said members and engage said clutch friction surfaces, and means to disengage said clutch friction surfaces and engage said brake friction surfaces.

4. A friction drive member comprising a brake and a clutch, a shaft, an element rotatable with said shaft, a plurality of friction surfaces comprising the clutch and a plurality of friction surfaces comprising the brake, said clutch and brake surfaces being mounted for alternate engagement, a pair of members slidably carried by said rotatable element and movable relative to each other, flanges carried by each member with a flange of each member in cooperating position with said clutch surfaces and a second flange in cooperating position with said brake surfaces, piston and cylinder means to shift said members and engage one set of said friction surfaces, and means to withdraw said members and flanges from coacting position with said engaged set of surfaces and shift said other flanges into engagement with said other set of friction surfaces.

5. A friction drive member comprising a brake and a clutch, a shaft, a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member disposed between said clutch surfaces and a second flange disposed between said brake surfaces, piston and cylinder means mounted between said clutch surfaces to shift said members and engage one set of said friction surfaces.

6. A friction drive member comprising a brake and a clutch, a shaft, a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member disposed between said clutch surfaces and a second flange disposed between said brake surfaces, piston and cylinder means mounted between said clutch surfaces to shift said members and engage one set of said friction surfaces, and means to withdraw said members and flanges from coacting position with said engaged set of surfaces and shift said other flanges into engagement with said other set of friction surfaces.

7. A friction drive member comprising a brake and a clutch, a shaft, a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member disposed between said clutch surfaces and a second flange disposed between said brake surfaces, piston and cylinder means to shift said members and engage said clutch friction surfaces, and means to disengage said clutch friction surfaces and engage said brake friction surfaces.

8. A friction drive member comprising a brake and a clutch, a shaft, an element rotatable with said shaft, a plurality of friction surfaces comprising the clutch and a plurality of friction surfaces comprising the brake, said clutch and brake surfaces being mounted for alternate engagement, a pair of members slidably carried by said rotatable element and movable relative to each other, flanges carried by each member with a flange of each member disposed between said clutch surfaces and a second flange disposed between said brake surfaces, piston and cylinder means mounted between a flange carried by one member and a cooperating flange carried by the other member to shift said members and engage said clutch friction surfaces.

9. A friction drive member comprising a brake and a clutch, a shaft, a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member disposed between said clutch surfaces and a second flange disposed between said brake surfaces, piston and cylinder means mounted between a flange carried by one member and a cooperating flange carried by the other member to shift said members and engage said clutch friction surfaces, and means to disengage said clutch friction surfaces and engage said brake friction surfaces.

10. A friction drive member comprising a brake and a clutch, a shaft, a sleeve rotatable with said shaft, a plurality of friction surfaces comprising the clutch and a plurality of friction surfaces comprising the brake, said clutch and brake surfaces being mounted for alternate engagement, a pair of members slidably carried by said sleeve and movable relative to each other, flanges carried by each member with a flange of each member in cooperating position with said clutch surfaces and a second flange in cooperating position with said brake surfaces, piston and cylinder means mounted between a flange carried by one member and a cooperating flange carried by the other member to shift said members and engage said cluch friction surfaces.

11. A friction drive member comprising a brake and a clutch, a shaft, an element rotatable with said shaft, a plurality of friction surfaces comprising the clutch and a plurality of friction surfaces comprising the brake, said clutch and brake surfaces being mounted for alternate engagement, a pair of members slidably carried by said rotatable element and movable relative to each other, flanges carried by each member with a flange of each member in cooperating position with said clutch surfaces and a second flange in cooperating position with said brake surfaces, piston and cylinder means mounted between a flange carried by one member and a cooperating flange carried by the other member to shift said members and engage said clutch friction surfaces and means to disengage said clutch friction surfaces and engage said brake friction surfaces.

12. In a friction drive mechanism comprising a brake and a clutch, a shaft, a sleeve rotatable with said shaft, a plurality of friction surfaces comprising the clutch and a plurality of friction surfaces comprising the brake, said clutch and brake surfaces being mounted for alternate engagement and comprising an annular member formed by two semi-circular halves, friction material fastened to said member, an axial extension on said member adapted to carry a similar member of two semi-circular halves rigidly connected thereto in a staggered arrangement to ensure annular reinforcement of said first-mentioned member.

13. A friction drive member comprising a brake and a clutch, a shaft, a plurality of friction surfaces comprising the clutch and a plurality of friction surfaces comprising the brake, a member between the clutch and brake surfaces and slidable with respect to the shaft, a second member slidable with respect to said shaft in embracing position to and movable with respect to said first member, piston means disposed between said clutch surfaces to shift said first member by movement of said piston, fluid means to actuate said piston and move said members to engage said clutch surfaces and means to withdraw said members from coacting position with the clutch and urge the same into coacting relation with the brake.

ALVIN F. GROLL.